United States Patent
Kumar et al.

(10) Patent No.: US 11,816,606 B2
(45) Date of Patent: Nov. 14, 2023

(54) QUANTUM-CLASSICAL SOLUTION STACK FOR VEHICLE ROUTING PROBLEM

(71) Applicant: INTERNATIONAL BUSINESS MACHINES CORPORATION, Armonk, NY (US)

(72) Inventors: Vaibhaw Kumar, Frederick, MD (US); Dimitrios Alevras, West Chester, PA (US); Imed Othmani, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 17/542,484

(22) Filed: Dec. 5, 2021

(65) Prior Publication Data

US 2023/0177415 A1 Jun. 8, 2023

(51) Int. Cl.
  *G06N 10/60* (2022.01)
  *G06Q 10/047* (2023.01)
  *G06N 10/80* (2022.01)

(52) U.S. Cl.
  CPC ........... *G06Q 10/047* (2013.01); *G06N 10/60* (2022.01); *G06N 10/80* (2022.01)

(58) Field of Classification Search
  CPC ....... G06Q 10/047; G06N 10/60; G06N 10/80
  See application file for complete search history.

(56) References Cited

FOREIGN PATENT DOCUMENTS

| CN | 104992242 A | 10/2015 |
| CN | 104700160 B | 6/2018 |
| CN | 111669328 A | 9/2020 |

OTHER PUBLICATIONS

Mell, P. et al., "Recommendations of the National Institute of Standards and Technology"; NIST Special Publication 800-145 (2011); 7 pgs.
Vikstal, P. et al., "Applying the Quantum Approximate Optimization Algorithm to the Tail Assignment Problem"; arXiv:1912.10499v2 [quant-ph] (2020); 11 pgs.
Zhang, J. et al., "A Hybrid Quantum-Inspired Evolutionary Algorithm for Open Vehicle Routing Problem"; IEEE/ASME International Conference on Advanced Intelligent Mechatronics (2009); 6 pgd.
Feld, S. et al., "A Hybrid Solution Method for the Capacitated Vehicle Routing Problem Using a Quantum Annealer"; Frontiers in ICT (2019); vol. 6:13; 13 pgs.
Harwood, S. et al., "Formulating and Solving Routing Problems on Quantum Computers"; IEEE Transactions on Quantum Engineering (2021); vol. 2, 17 pgs.

(Continued)

*Primary Examiner* — Mathew Franklin Gordon
(74) *Attorney, Agent, or Firm* — Intelletek Law Group, PLLC; Gabriel Daniel, Esq.

(57) ABSTRACT

A method and system of generating a route includes receiving information regarding a set of nodes to be serviced. One or more parameters of each node are determined. A capacity of each of the one or more vehicles is determined. A classical computer is used to generate a set of feasible routes based on the one or more parameters of each node and the capacity of each of the one or more vehicles. A number of bags N to divide the set of feasible routes is determined. The feasible routes are distributed into the N bags. The N bags are sent to a quantum computer to calculate a most efficient combination of feasible routes that cover all nodes to be serviced.

20 Claims, 13 Drawing Sheets

(56) References Cited

OTHER PUBLICATIONS

Zhang, J. et al., "Multiobjective Quantum Evolutionary Algorithm for the Vehicle Routing Problem with Customer Satisfaction"; Mathematical Problems in Engineering (2012); 20 pgs.

Irie, H. et al., "Quantum Annealing of Vehicle Routing Problem with Time, State and Capacity"; arXiv:1903.06322v1 (2019); 14 pgs.

Behera, B. et al., "Solving Vehicle Routing Problem Using Quantum Approximate Optimization Algorithm"; arXiv:2002.01351v1 (2020); 7 pgs.

Example Definition of Variables:

- $x_{ij}^k$ which is 1 if vehicle $k$ goes from customer $i$ to customer $j$, and 0 otherwise.
- $t_i^k$ the time (number of seconds after the start of the day) when vehicle $k$ arrives at customer $i$.
- $y_k$ which is 1 if vehicle $k$ is used, 0 otherwise.

Example Objective Function:

The objective function to minimize the total cost consisting of the vehicle, mileage, and time cost:

$$f \sum_{k \in K} y_k + m \sum_{k \in K} \sum_{i,j \in N, i \neq j} d_{ij} x_{ij}^k + h \sum_{k \in K} \sum_{i,j \in N, i \neq j} t_{ij}^k \quad \text{(Eq. 1)}$$

Example Constraints:

- If a vehicle is used, then it may leave the depot based on the following:

$$\sum_{j \in V} x_{0j}^k = y_k \quad \forall k \in K \quad \text{(Eq. 2)}$$

- The vehicle may return to the depot based on the following:

$$\sum_{j \in V} x_{j0}^k = y_k \quad \forall k \in K \quad \text{(Eq. 3)}$$

- Each node $j \in V$ request may be served by exactly one vehicle $$\sum_{k \in K} \sum_{i \in N, i \neq j} x_{ij}^k = 1 \quad \forall j \in V \quad \text{(Eq. 4)}$$

- If vehicle $k$ is visiting node $j$, that vehicle must also leave node $j$ $$\sum_{i \in N, i \neq j} x_{ij}^k = \sum_{i \in N, i \neq j} x_{ji}^k \quad \forall j \in V, k \in K \quad \text{(Eq. 5)}$$

- If vehicle $k$ is used, it can serve all nodes based on its capacity $C$

FIG. 8A

- If vehicle $k$ goes from node $i$ to node $j$, the vehicle cannot be at node $j$ before the time it was at node $i$ plus the time it took to drive from $i$ to $j$ and the service time at $i$, as provided below $$t_j^k \geq (t_i^k + \tau_{ij} + s_i) x_{ij}^k \qquad \forall i \in V, j \in N, i \neq j, k \in K \qquad \text{(Eq. 6)}$$

This is a non-linear constraint that can be linearized using the big-$M$ technique:

$$t_j^k - t_i^k \geq \tau_{ij} + s_i - M(1 - x_{ij}^k) \qquad \forall i \in V, j \in N, i \neq j, k \in K \qquad \text{(Eq. 7)}$$

where $M$ can be set to be $\max\{b_i + \tau_{ij} + s_i - a_j\}$. Note that in CPLEX this linearization is not necessary since the constraint can be entered as an *indicator constraint*.

- Also, to meet time window requirements (these can be entered as lower and upper bounds on the variable).

$$a_i \leq t_i^k \leq b_i \qquad \forall i \in N, k \in K \qquad \text{(Eq. 8)}$$

- To break symmetries we introduce the following constraints (which assume ordering of vehicles and are not needed for feasibility) that state that vehicle $k+1$ cannot be used before vehicle $k$ is used:

$$y_{k+1} \leq y_k \qquad \forall k = 1, \ldots, |K| - 1 \qquad \text{(Eq. 9)}$$

FIG. 8B

QUANTUM-CLASSICAL SOLUTION STACK FOR VEHICLE ROUTING PROBLEM

BACKGROUND

Technical Field

The present disclosure generally relates to routing technology, and more particularly, to advanced computing architectures that are configured to process complex routing scenarios.

Description of the Related Art

A vehicle routing problem (VRP) relates to a combinatorial optimization and integer programming task that attempts to provide an optimal set of routes for a fleet of vehicles to travel to a predetermined set of destination points. A capacitated VRP with Time-Windows involves finding optimal set of routes that incurs least cost given the capacity of the vehicle, demands at each destination location, service times, and time-windows for the delivery. Obtaining effective solutions to such a problem is salient for various industries, such as, without limitation, transportation, manufacturing, telecommunications, utilities and energy, as well as the public sector. The problem is highly complex and is known to be NP-hard (non-deterministic polynomial time hard) and may not be solved efficiently, if at all, with conventional computing architectures.

SUMMARY

According to various exemplary embodiments, a computing device, a non-transitory computer readable storage medium, and a method are provided to determine a route combination. Information regarding a set of nodes to be serviced is received. One or more parameters of each node are determined. A capacity of each of the one or more vehicles is determined. A classical computer is used to generate a set of feasible routes based on the one or more parameters of each node and the capacity of each of the one or more vehicles. A number of bags N to allocate the set of feasible routes is created based on a number of feasible routes. The feasible routes are distributed into the N bags. The N bags are sent to a quantum computer to calculate a most efficient combination of feasible routes that cover all nodes to be serviced.

According to one embodiment, the nodes to be serviced are divided into a predetermined number of clusters.

According to one embodiment, each cluster is based on a proximity between the nodes to be serviced.

According to one embodiment, a number of feasible routes in a bag is based on a capacity of the quantum computer.

According to one embodiment, a number of feasible routes in a bag equals a number of qubits in the quantum computer.

According to one embodiment, the one or more parameters of each node include at least one of: a time window for an arrival of a vehicle of the one or more vehicles, a duration of service requested by the node, or a size of a package to be delivered to the node.

According to one embodiment, the distribution of the feasible routes into the N bags is based on a random selection from the feasible routes.

According to one embodiment, the distribution of the feasible routes into the N bags is based on each bag including each node of the set of nodes to be serviced.

According to one embodiment, calculating a most efficient combination of feasible routes comprises calculating, by the quantum computer, one or more feasible routes that have a lowest overall cost while servicing each node in a predetermined cluster.

In one embodiment, a hybrid quantum-classical computing platform for route management includes a classical computing device and a quantum computing device having N qubits. The classical computing device is configured to receiving information regarding a set of nodes to be serviced; determining one or more parameters of each node; determining a capacity of each of the one or more vehicles; generating a set of feasible routes based on the one or more parameters of each node and the capacity of each of the one or more vehicles; creating a number of bags N to allocate the set of feasible routes based on a number of feasible routes; and distributing the feasible routes into the N bags. The quantum computing device is configured to: for each of the N bags, applying a feasible route to a corresponding qubit. A most efficient combination of feasible routes is calculated that covers all nodes to be serviced.

In one embodiment, the classical computing device is further configured to dividing the nodes to be serviced into a predetermined number of clusters. Each cluster is based on a proximity to between the nodes to be serviced.

In one embodiment, the distribution of the feasible routes into the N bags is based on a random selection from the feasible routes, or each bag including each node of the set of nodes to be serviced.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 8A and 8B provide a mathematical framework for the calculation of a capacitated VRP with Time-Windows for a single depot, consistent with an illustrative embodiment.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Figure 1:
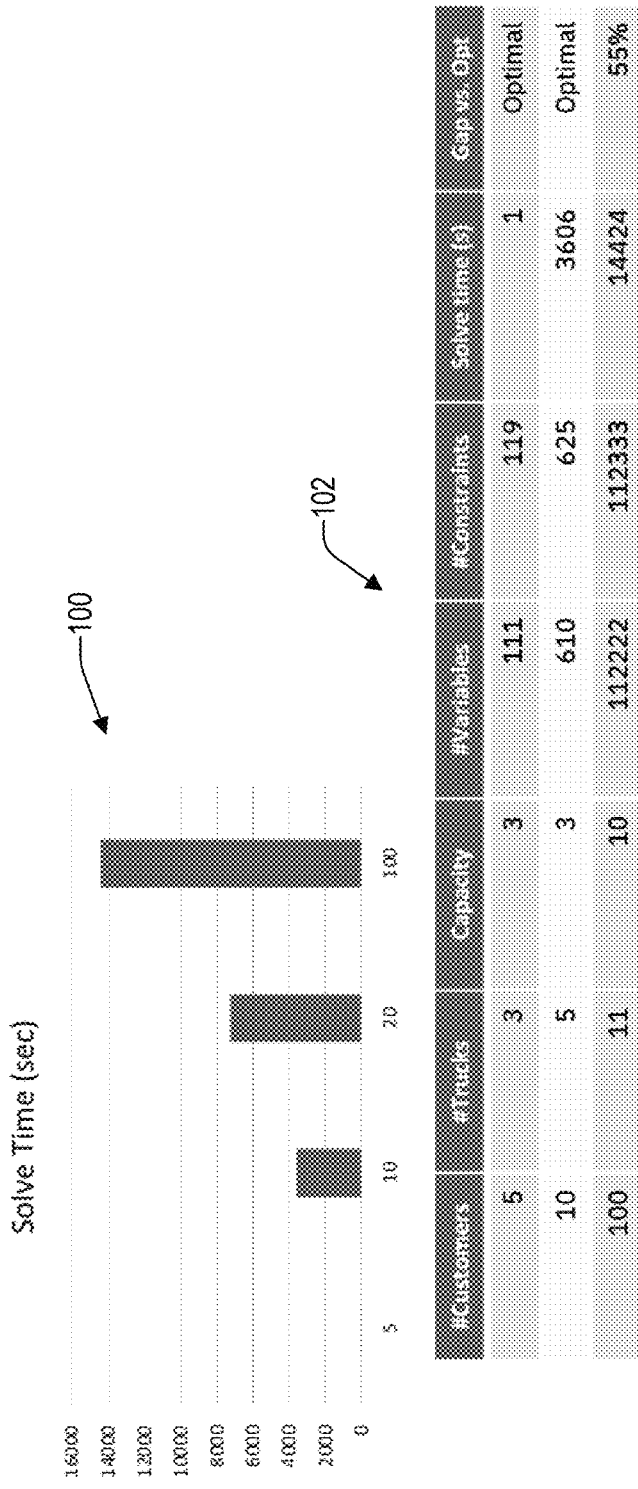
FIG. 1 provides an overview of example limitations of using a classical computing device alone, consistent with an illustrative embodiment.

The present disclosure generally relates to the advanced computing architectures that are configured to process complex routing scenarios. Today, routing problems encompass a wide range of tasks in logistics and operations research. These tasks are generally concerned with the optimal management of a fleet of vehicles (e.g., how should each vehicle be dispatched in order to satisfy some goal, while minimizing time or resources (e.g., cost)). There are many variants and specifications of the problem to certain scenarios. The teachings herein include vehicle routing problem with time windows (VRPTW). Typical solution approaches to VRPTW on classical computing devices include mathematical formulations involving discrete variables. Consequently, classical methods tend to have worst-case solution times that scale exponentially with the number of decision variables. In this regard, reference is made to FIG. 1, which provides an overview of example limitations of using a classical computing device alone, consistent with an illustrative embodiment. More specifically, FIG. 1 illustrates a graph 100 that indicates a length of time it may take to determine an appropriate routing solution for a different number of destinations, sometimes referred to herein as nodes or customers. If the number of nodes exceeds approximately 100, a classical computing platform may take too long to solve the routing problem, if capable at all. FIG. 1 also illustrates a chart 102 indicating that as the number of nodes increases, the gap between the solution identified by the classical computing platform and an ideal routing increases. As illustrated in table 102, the gap for 100 nodes is a staggering 55% for a reasonable computing time, making a classical computing platform by itself not a viable option in many scenarios.

Figure 2:
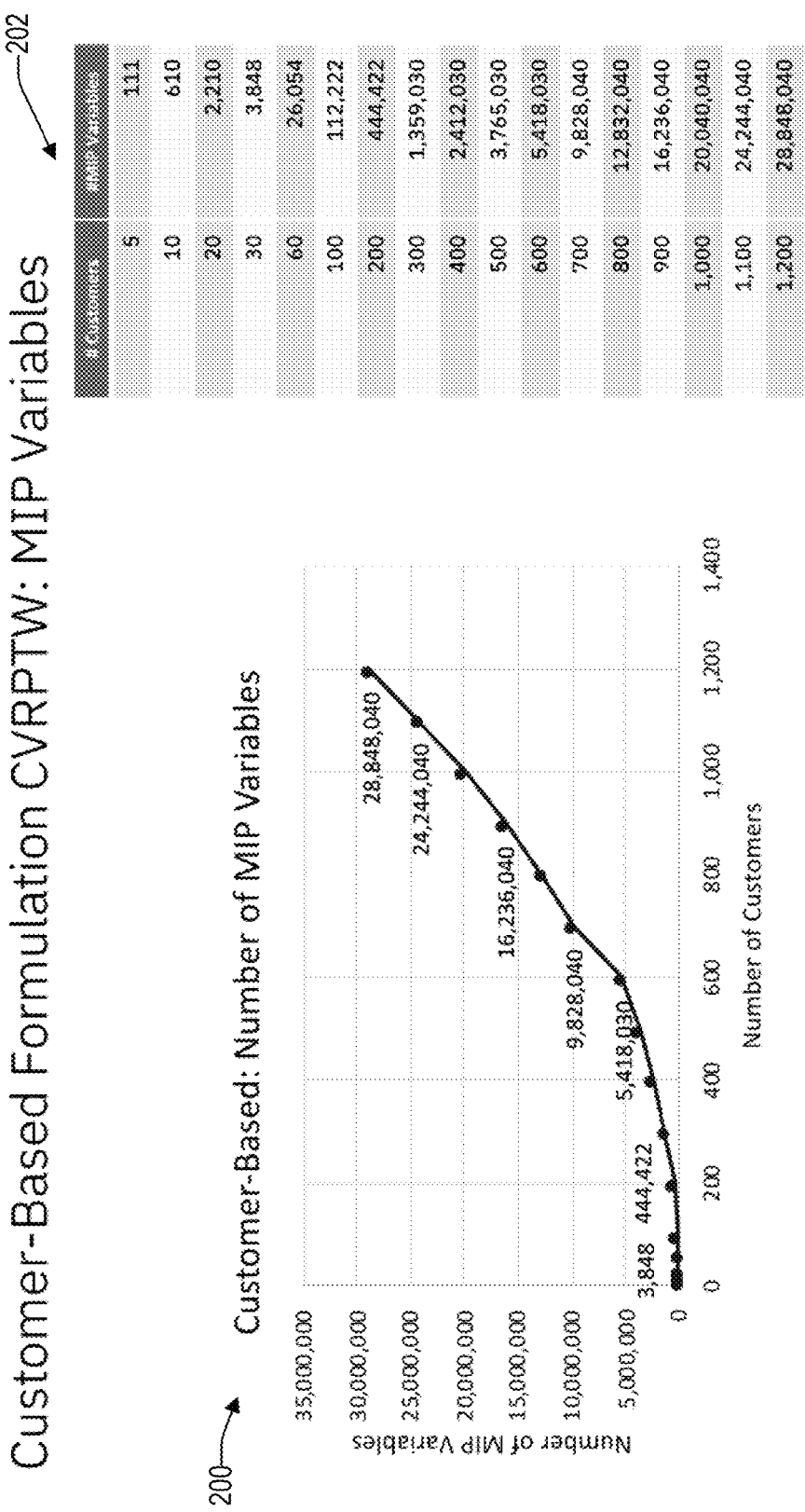
FIG. 2 illustrates a chart and a table, both of a number of nodes versus a number of mixed integer programming variables presented to a computing platform, consistent with an illustrative embodiment.

The weakness of a classical computing platform is further explained in FIG. 2, which illustrates a chart 200 and a table 202 of a number of nodes versus a number of mixed integer programming variables presented to a computing platform. FIG. 2 demonstrates that the number of variables used for the node-based MIP formulation increases binomially with the number of nodes, which may exhaust the capability of a classical computing platform when the number of nodes (e.g., customers) exceeds a predetermined threshold.

Accordingly, the teachings herein provide a hybrid quantum-classical computing platform that facilitates the processing of relatively large (e.g., over 5000) routing problems of practical magnitude efficiently and accurately. The inventors have recognized that to solve the traditional formulation of the routing problem having a significant size, using quantum computers, may overwhelm such platform (e.g., require millions of qubits). The teachings herein provide a technical solution to this problem by facilitating compatibility with quantum computers having various number of qubits. The routing optimization problem is decomposed to a feasible routing problem and an optimal route selection problem presented as exact set covering problem which is also NP-hard. A novel decomposition approach, such as "bagging," can be used to solve the set cover problem, which further reduces the qubit requirements, but at the same time guarantees minimal loss of quality under the performance bounds. In one aspect, the hybrid quantum-classical computing platform is highly flexible (e.g., as the quantum hardware evolves) and adaptable to future versions of any quantum hardware and software, and provides an integration of quantum computing to the existing classical computing-based workflows. The techniques described herein may be implemented in a number of ways. Example implementations are provided below with reference to the following figures.

Example System

Figure 3:
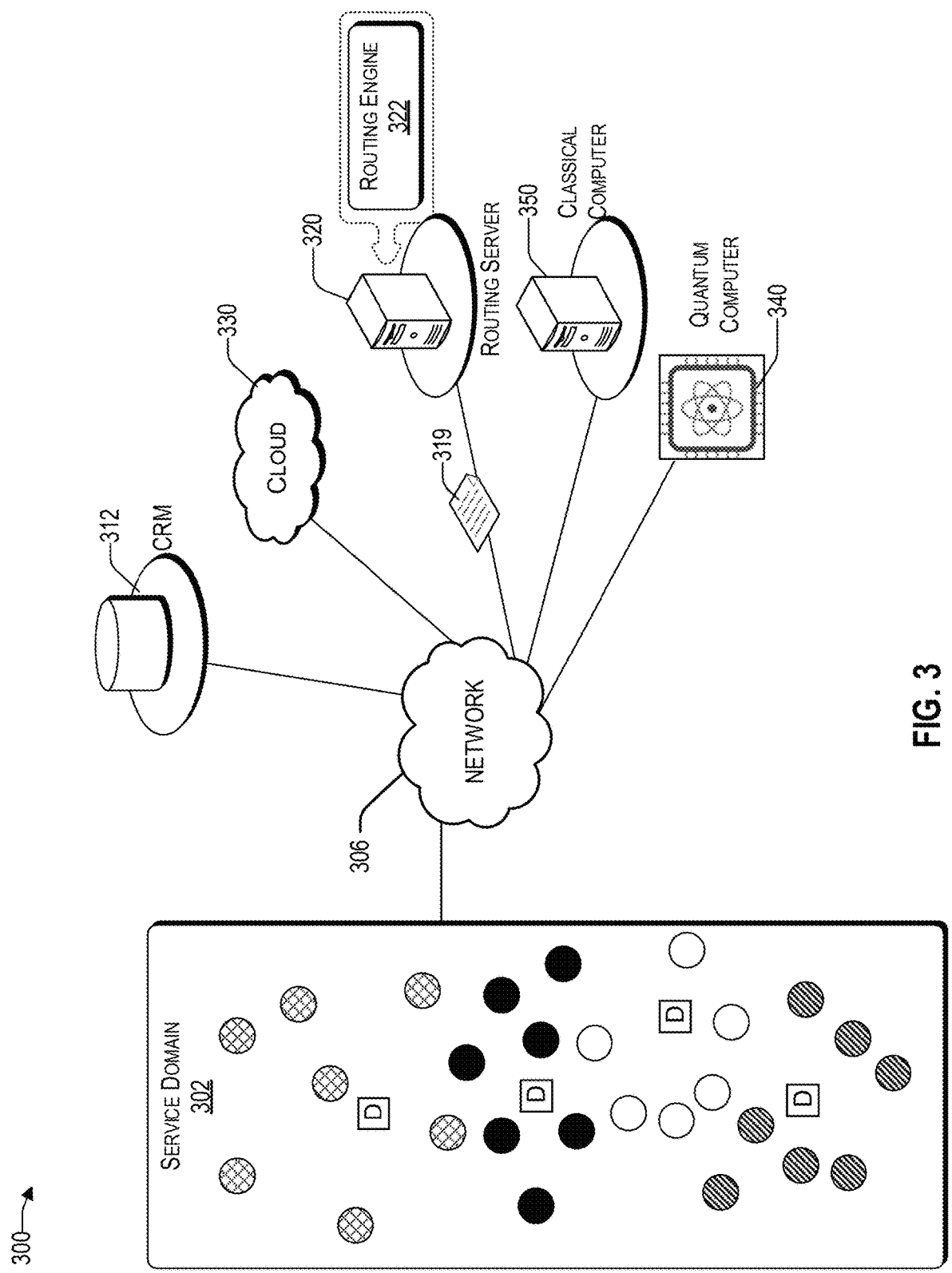
FIG. 3 illustrates an example architecture for implementing a hybrid quantum-classical computing platform, consistent with an illustrative embodiment.

FIG. 3 illustrates an example architecture 300 for implementing a hybrid quantum-classical computing platform, consistent with an illustrative embodiment. Architecture 300 includes a network 306 that allows various computing devices and databases to be accessed by the routing engine 322. The network 306 may be, without limitation, a local area network ("LAN"), a virtual private network ("VPN"), a cellular network, the Internet, or a combination thereof. For example, the network 306 may include a mobile network that is communicatively coupled to a private network, sometimes referred to as an intranet, which provides various ancillary services, such as communication with various databases, such as the customer relations manager (CRM) 312, a classical computer 350, a quantum computer 340, and as well as various nodes (represented by circles) and depots (represented by squares) in a service domain 302. To facilitate the present discussion, network 306 will be described, by way of example and not by way of limitation, as a mobile network as may be operated by a service provider to provide a wide range of mobile communication services and supplemental services or features to its subscriber customers and associated mobile device users.

The service domain 302 includes various nodes, sometimes referred to herein as customers, that can be serviced by one or more depots. Each depot may include one or more service vehicles. Each vehicle can have a same capacity, or the capacity may vary between vehicles. But each vehicle has a limited capacity, which can be described as a number of uniform packages that can be carried thereby. For example, a standard vehicle (e.g., truck) can carry 120 standard packages. Larger packages may be described in multiples of standard unit packages (e.g., 2, 3, etc.).

A Vehicle routing problem with time windows (VRPTW) in the context of FIG. 3 can be defined as choosing the number of vehicles to use out of a set of available vehicles to serve a cluster of nodes (e.g., customers) in predetermined time windows. The clusters are depicted as circles having a uniform pattern. By way of example only and not by way of limitation, the service domain 302 includes three clusters and four depots. Each vehicle has a limited capacity. It starts from the depot and terminates at the depot. Each node should be served once.

The routing engine 322 can be a program stored in a routing server 320 that is configured to orchestrate the routing between vehicles and nodes in the service domain 302. The routing engine 322 may receive as input 319 a set of node and depot locations in the service domain 302, travel times and distance between the locations, demand and allowed time windows at each of the locations, capacity of each vehicle, proximity to a depot, as well as relevant costs involved. In one embodiment, the routing engine 322 determines the restrictions for each node from the CRM 312, which is coupled for communication via the network 306. In one example, the CRM database 312 offers its account holders (e.g., user of the service described herein) on-line access to a variety of functions related to the account holders' account, such as open times for accepting service/delivery, any impediments that may delay access to a node (e.g., many stairs to climb, etc.), password control, etc. The CRM database 312 may provide an account holder an interface via the Internet to update any preferences and/or restrictions.

The routing engine 322 facilitates a set of routes starting from a depot, visiting all the node locations, and returning back to the depot, while respecting the capacity and time constraints. The problem as described represents a time-windowed capacitated vehicle routing problem. The arc-based formulation of such a problem is a mixed-integer linear programming (MILP) problem.

A classical solver on a classical computing platform 350 (such as CPLEX®), while solving the arc-based formulation, may be slow to converge to optimality, if at all. Also, a relatively large size problem becomes increasingly difficult to handle by a classical computer 350 with such solvers. In this regard, the routing engine 322 orchestrates a hybrid quantum-classical computing platform by using a classical solver 350 to generate, relatively quickly, a "good" (e.g., initial) pool of feasible routes, without addressing optimality. For example, a pool may comprise a set of routes $\{R_1, R_2, \ldots, R_n\}$, where each route $R_i$ represents a route taken by the vehicle, starting from a depot, visiting a set of node locations, and returning back to the depot.

Such a "good" (e.g., initial unoptimized) set of routes can then be sent by the routing engine 322 to a quantum solver 340 to find an optimal subset of routes that incur the least overall cost (i.e., most efficient) while collectively being able to visit all the node locations. This scenario presents a weighted-set cover problem and is NP-complete.

In order to adapt such a framework to solve relatively large-scale problem, the routing engine 322 provides re-sizing of the data at different levels, thereby providing compatibility with the quantum computer 340. First, clustering may be used to cluster locations such that the classical solver 350 processes relatively smaller, easily tractable, arc-based formulation of the routing task, in order to generate the set of possible routes. At a separate stage, the routing engine 322 uses the quantum computer 340 to solve the weighted-set-cover problem. To that end, a bagging architecture can be used that allows running smaller problems that fit on and are adaptable to the existing quantum hardware. Each of these concepts is discussed in more detail later.

While the historical CRM 312, routing server 320 and classical computer 350 have been illustrated by way of example to be on different platforms, it will be understood that, in various embodiments, their functionality described herein can be combined in different combinations. In other embodiments, these computing platforms may be implemented by virtual computing devices in the form of virtual machines or software containers that are hosted in a cloud 330, thereby providing an elastic architecture for processing and storage.

Example Block Diagrams

Figure 4:
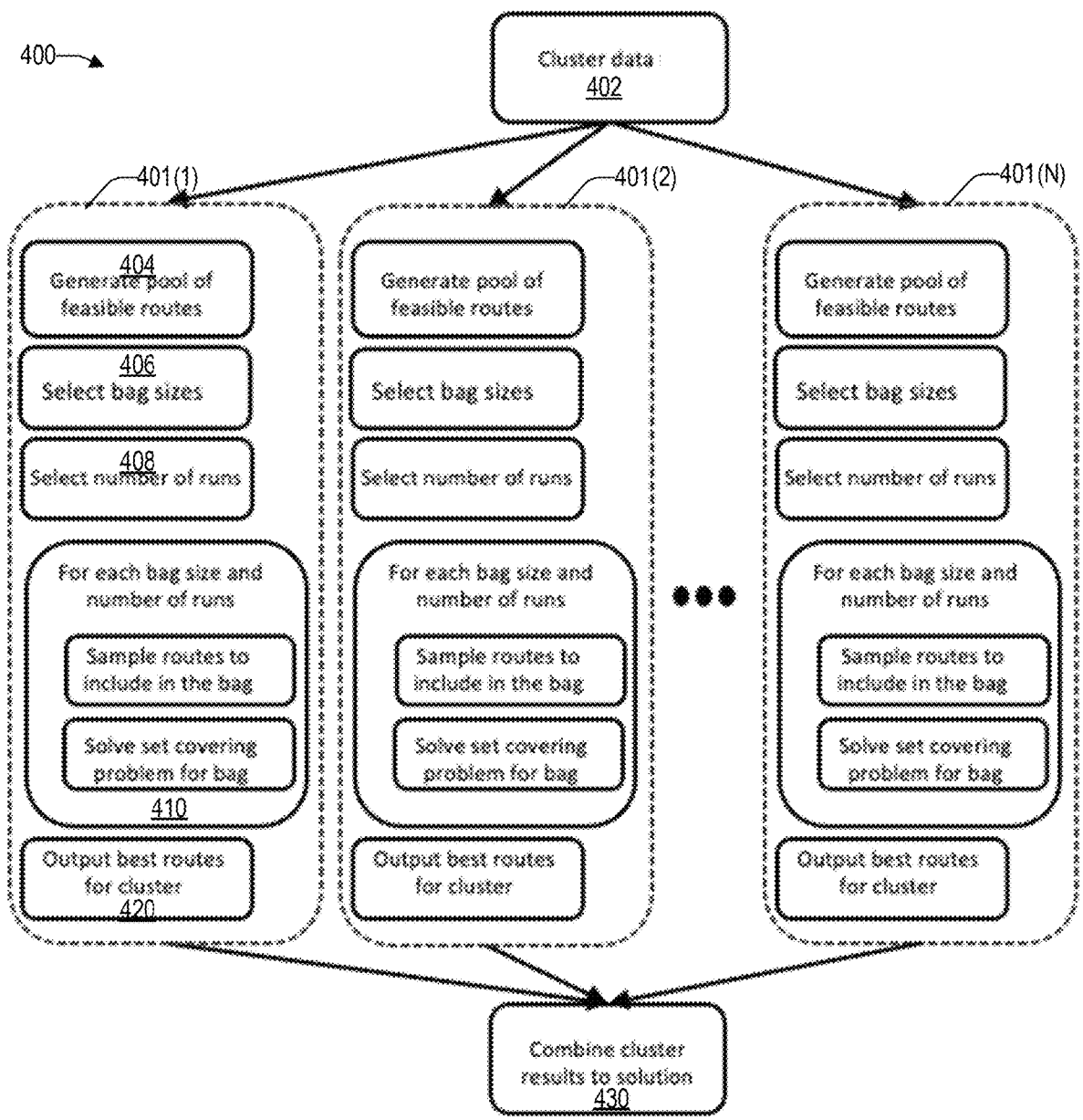
FIG. 4 is a conceptual block diagram of a determination of a routing using a hybrid quantum-classical approach, consistent with an illustrative embodiment.

Reference now is made to FIG. 4, which is a conceptual block diagram of a determination of a routing using a hybrid quantum-classical approach, consistent with an illustrative embodiment. In the system 400, the routing engine 322 receives a list of nodes to be serviced in a form of a data packet. The nodes are separated into clusters 402, represented by clusters 401(1) to 401(N). In one embodiment, the number of clusters is based on a predetermined limit of nodes in a cluster (e.g., 200 nodes per cluster). In one embodiment, the number of nodes in each cluster are substantially equal (e.g., one cluster may have an additional node to service if there is an odd number of nodes). The clustering may be based on predetermined criteria, discussed in more detail later. For each cluster, a set of feasible routes is determined (e.g., 404) by a classical computing device. In one embodiment, an arc-based formulation is used. Feasibility may be based on a capacity of the vehicle and/or parameters (e.g., constraints) of each node to be serviced by the vehicle. For example, each permutation (e.g., route) must meet a timing requirement for the delivery, as well as the capacity of the vehicle (e.g., whether a package or service is compatible with the vehicle). The feasible routes may be based on a single vehicle from a depot, a plurality of vehicles from a depot, a plurality of depots having one or more vehicles, or any combination thereof.

It will be understood that the generation of feasible routes may lead to many (e.g., millions) of permutations, which could overwhelm the processing power of a quantum computer to provide a reliable result in a reasonable timeframe. The different permutations are therefore separated into a predetermined number of bags. The number of routes in each bag may be based on the capability of the quantum computer. In one embodiment, the number of routes in each bag is based on the number of qubits in the quantum computer.

The routing engine 322 then determines a number of runs 408. In one embodiment, the routing engine 322 uses a classical computing device to perform this function. For example, routes are sampled to include in the bag. A set covering problem is solved for each bag by way of a quantum computer. Each cluster then provides the best routes in terms of overall efficiency, to the routing engine. In various embodiments, efficiency may be based on the amount of energy, time, and effort involved. In some embodiments, the efficiency is based on a cost analysis, including, without limitation, cost per mile (which may be different for each type of vehicle), cost per hour or mile of vehicle used, any associated labor cost per unit time, etc. Accordingly, the results from each cluster are combined 430 and the best route or combination of routes is then selected based on the calculated efficiency. These concepts will be discussed in more detail later.

Figure 5:
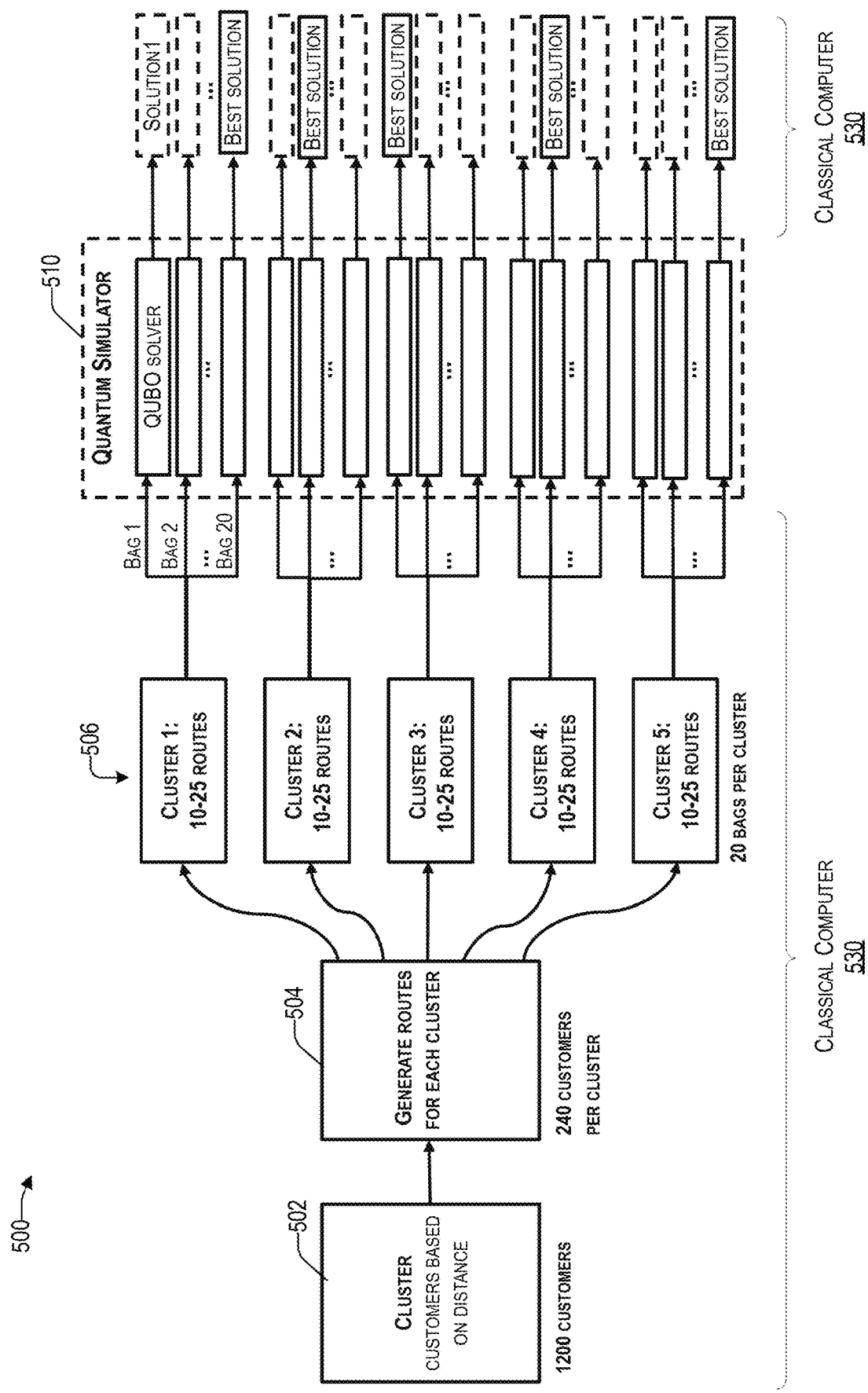
FIG. 5 is a block diagram of a division of processing between a classical computing device and a quantum simulator to determine a most efficient combination of routes to service a set of nodes in a service domain, consistent with an illustrative embodiment.

FIG. 5 is a block diagram 500 of a division of processing between a classical computing device 530 and a quantum simulator 510 to determine a most efficient combination of routes to service a set of nodes in a service domain, consistent with an illustrative embodiment. In one embodiment, the nodes (e.g., customers) of a service domain are divided into clusters based on node distance from a closest depot (e.g., by applying a proximity-based clustering algorithm to cluster node locations into substantially equal size clusters), as illustrated in block 502. By way of example only and not by way of limitation, in the example of FIG. 5 it is assumed that there are 1200 nodes to be serviced. For an example cluster of five (i.e., blocks 506), there would be 240 nodes in each cluster. An arc-based problem is set up on a classical solver (e.g., computer) 530 for each cluster.

At block 504, for each cluster, a set of feasible routes is generated by the classical computer 530. The classical computer 530 can be run for a predetermined time, without worrying about optimality, to generate a set of routes $\mathcal{L}$ for each cluster. For example, each cluster may have 10 to 25 routes. Another set of routes $\mathcal{M}$ may be created for each cluster. In various embodiments, the second set of routes $\mathcal{M}$ for each cluster can be generated by the classical computer 530 by (i) random permutation of nodes over a route; (ii) by exchanging nodes between a pair of routes; and/or (iii) by fusing pairs of routes together. Each of these options may be performed without violating time (e.g., of arrival) and capacity (e.g., of the vehicle) constraints. Two sets of routes $\mathcal{L}$ and $\mathcal{M}$ provides a final "good" pool of routes $\mathcal{R}$ of clusters.

In the present example, the number of bags is 20. In one embodiment, the number of bags can be set by a user based on the bag size (e.g., number of qubits on a quantum computer) and the probability of a successful event. A successful event may relate to finding an optimal set of routes in at least one of the bags. In this regard, it is noted that a quantum computer 510 solves a weighted-set cover problem on the pool of routes generated during route generation step. If the size of such a pool $\mathcal{R}$ is relatively big (bigger than the problem sizes quantum solver can handle), we choose set of routes $\mathcal{U}_i$ where $i \in \{0, 1, \ldots, n_{bag}\}$ from the pool $\mathcal{R}$. Such subsets $\mathcal{U}_i$, referred to herein as "bags," can be formed by drawing elements from the pool $\mathcal{R}$ randomly from a uniform distribution or using a suitable rule. For each cluster, each of the bags associated with a cluster is processed by a quantum computer 510. In one embodiment, the quantum computer 510 uses a Quadratic unconstrained binary optimization (QUBO) to identify the efficiency (e.g., cost) of each solution (i.e., route). The most efficient solution is then selected by the classical computer 530.

Figure 6:
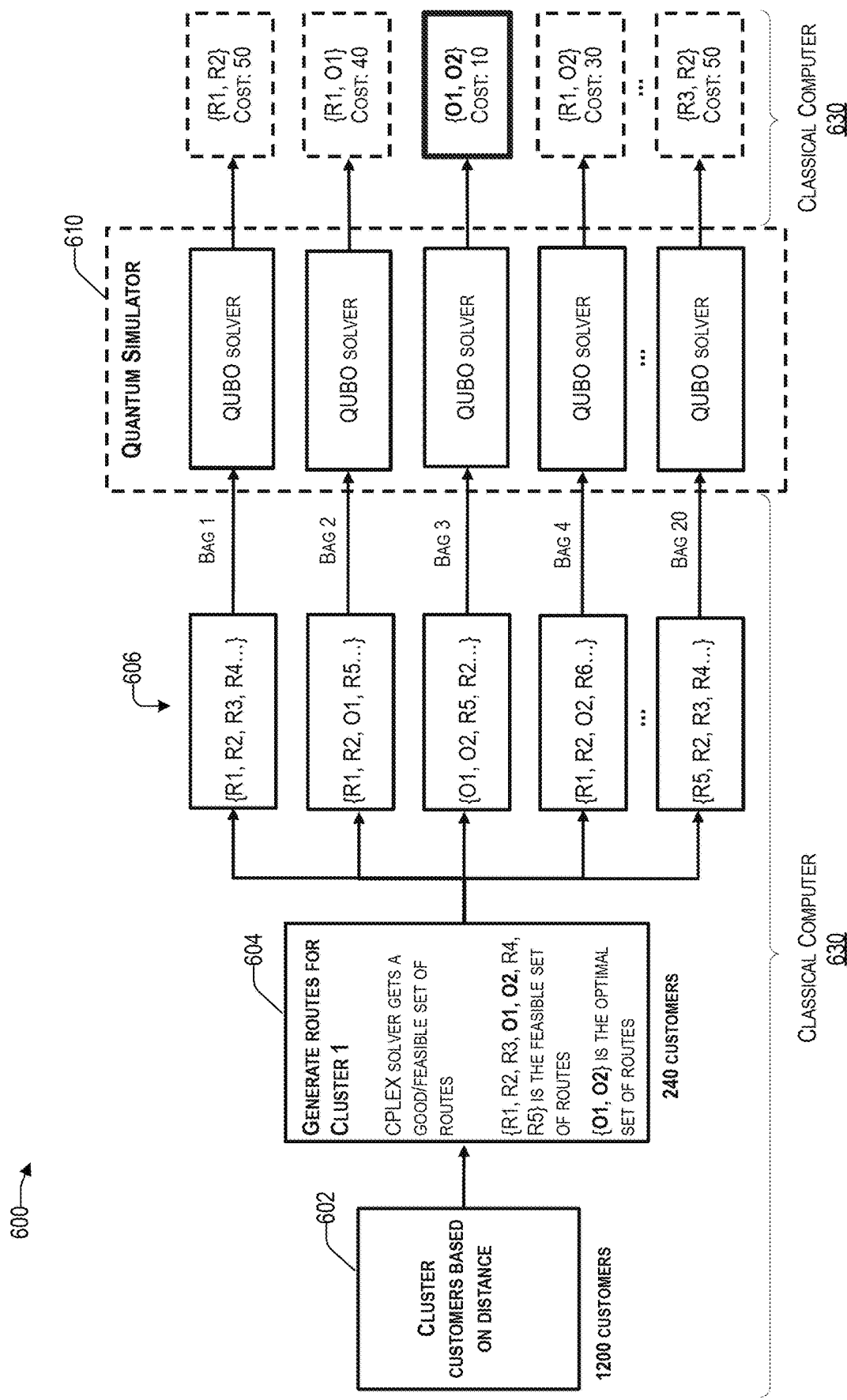
FIG. 6 is a block diagram of a bagging architecture that can be used to solve smaller problems on a quantum computer, consistent with an illustrative embodiment.

Reference now is made to FIG. 6, which is a block diagram of a bagging architecture 600 that can be used to solve smaller problems (e.g., for a single cluster) on a quantum computer 610, consistent with an illustrative embodiment. For example, the bagging architecture facilitates the solving of the routing problem on a quantum computer based on a number of qubits the hardware offers. Block 602 is substantially similar to that of block 502 of FIG. 2, and therefore not repeated here for brevity.

At block 604, for a given cluster (e.g., cluster 1) a set of feasible routes is generated by the classical computer 630. In one embodiment, a distributed parallel algorithm for mixed integer programming solver is used by the classical computer 630 to generate a set of routes $\mathcal{L}$ for the cluster. The resulting routes provide a "good" pool of routes $\mathcal{R}$ for the cluster. With an appropriate number of bags (e.g., based on a number of qubits in a quantum computer) and appropriate bag sizes, the routing engine operating the classical computer 630 can facilitate that the optimal set of routes denoted as $\mathcal{O}$ in FIG. 6, appears with a probability above a predetermined threshold probability ($p_d$) in at least one bag, as discussed in more detail below.

The number of routes in each bag may be based on the number of qubits in a quantum computer (simulator) 610. For example, if the quantum simulator has 5 qubits (i.e., N=5), then the number of routes in the bag would also be 5 (i.e., N).

In one embodiment, the routing engine can create bags in such a manner that each bag includes routes that provide complete coverage of nodes. To that end, a greedy algorithm may be used to create such bags. Such an algorithm can draw a route at random from the pool without replacement and continue drawing until complete coverage is achieved. In one embodiment, this algorithm is linear in input size. For example, an input size may be the number of routes generated by the classical computer. To form bags with complete coverage, an algorithm can be used that may be linear in the input size.

The number of bags to be applied to the quantum simulator 610 that includes an optimal set of routes $\mathcal{O}$ appears with a probability above a predetermined threshold ($p_d$) in at least one bag can be determined in different ways. In one embodiment, an upper bound on the number of bags can be determined by considering the case where bags are created by drawing a set of routes at random (e.g., without complete coverage).

For example, consider there are m optimal routes (that may not be known beforehand) and set of k (i.e., size of a bag, assuming all bags are of equal size) routes are drawn at random to create a bag. Without loss of generality, the routing engine can assume m<k. The probability of drawing an optimal set $\mathcal{O}$ where notation $$C_x^y = \frac{y!}{x!(x-y)!}$$

denotes the binomial coefficient. The creation of each bag can be described as a Bernoulli trial, where after t such trials, the probability of at least one success (i.e., seeing at least one bag with optimal set of routes $\mathcal{O}$) is $1-(1-p)^t$.

The number of bags to be used to make sure that the bag includes an optimal route at least once can be provided by calculating the probability of seeing at least one bag with optimal set of routes to be always more than $p_d$, as provided by the expression below:

$$1 - (1-p)^t \geq p_d$$

$$t \geq \frac{\log p_d}{\log(1-p)}$$

Where t is the minimum number of bags needed when routes are drawn uniformly at random.

When routes are drawn such that, they have complete coverage $$\frac{\log p_d}{\log(1-p)}$$

provides an upper bound on the number of bags.

Figure 7:
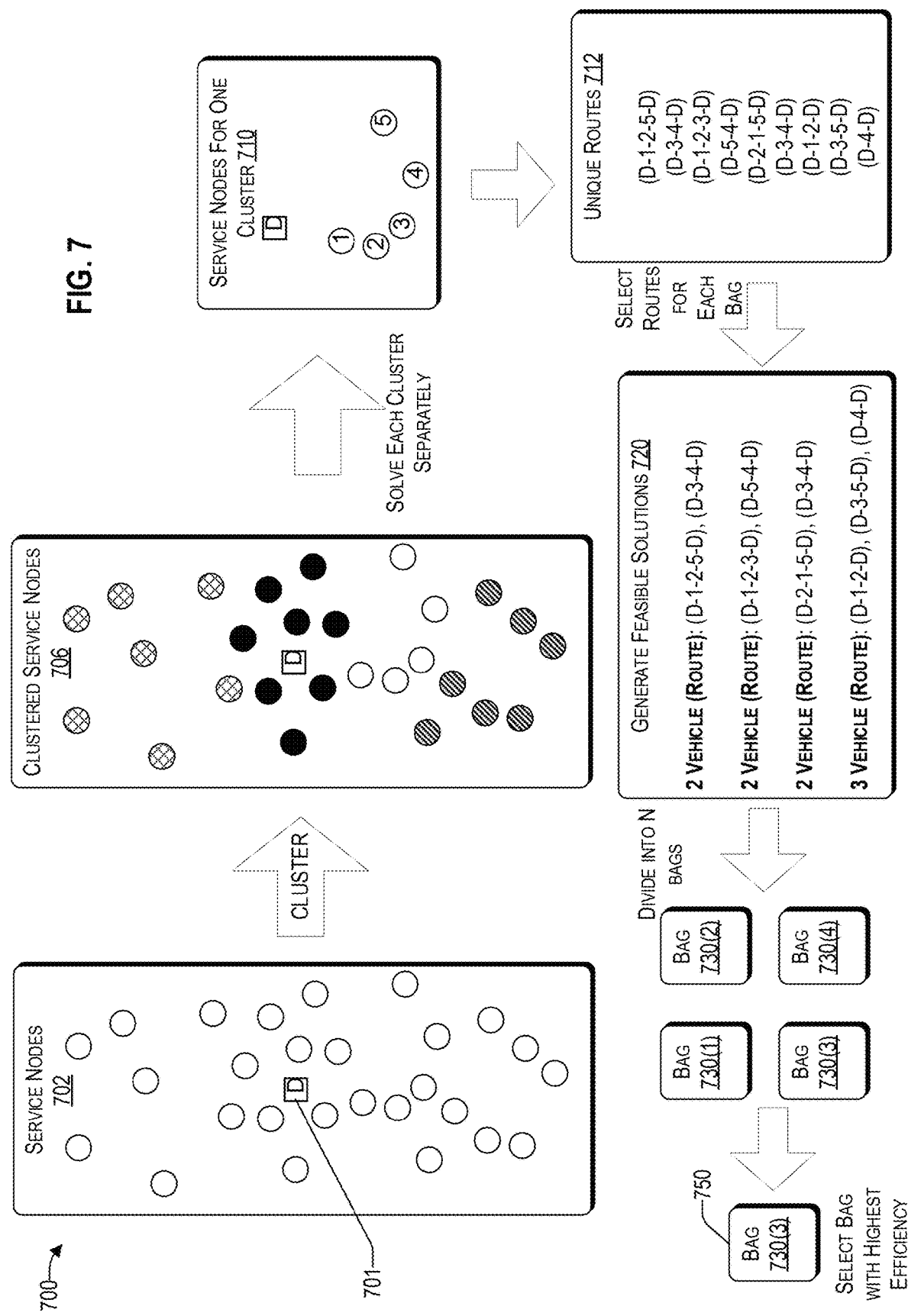
FIG. 7 is a conceptual block diagram for handling a routing request for a group of nodes using a hybrid quantum-classical computing process, consistent with an illustrative embodiment.

Reference now is made to FIG. 7 which shows a conceptual block diagram for handling a routing request for a group of nodes (e.g., customers) using a hybrid quantum-classical computing process, consistent with an illustrative embodiment. System 700 includes a plurality of service nodes (e.g., customers) represented by circles, that are to be accommodated by the routing service.

The routing engine may receive a number of nodes to be serviced. A determination is made as to how many depots are available (e.g., single depot 701 in the example of FIG. 7). A depot 701 may represent a warehouse or a storage facility where one or more vehicles are located. In the present scenario, a single depot 701 having three vehicles is illustrated, while it will be understood that additional (or fewer) vehicles and additional depots are within the scope of the present disclosure.

At block 706, the nodes are clustered based on predetermined criteria. In various embodiments, the predetermined criteria may be being in the same zone, having similar requirements (e.g., type of vehicle), ecological considerations (e.g., only electric vehicles allowed), proximity to a depot, proximity to one-another, and so forth. In the present example, the nodes are clustered based on their geographical location (i.e., proximity to one-another), represented by differently patterned circles. Each cluster is then solved separately to determine one or more ideal routes, as illustrated in block 710.

At block 712, the routing engine may use a classical computing device to generate different possible routing solutions, sometimes referred to herein as unique feasible routes. As mentioned previously, feasibility may be based on constraints of the vehicle and/or that of each node to be serviced by the vehicle. It will be understood that, in some scenarios, the number of different permutations may be very large (e.g., for a classical and/or quantum computer to process). In this regard, before applying the remaining permutations to a quantum computer, the unique feasible routes are distributed into a predetermined number of bags. That is because applying the selected routes directly to the quantum computer may overwhelm the processing capability (e.g., qubit count) of the quantum computer.

In one embodiment, a determination is made as to the number of available qubits in the quantum computer. The size (number of feasible routes) in a bag is then based on the number of qubits. In one example, if a quantum computer has N qubits, then N routes are placed in each bag. In one embodiment, the routes for each bag are selected randomly. In other embodiments, the routes are selected such that each bag includes each node to be serviced in that cluster. For example, a first routing solution applied to the first bag 730(1) may involve two vehicles from a single depot, wherein the vehicles travel (D-1-2-5-D) and (D-3-4-D), respectively, thereby covering all nodes. Another feasible routing solution may involve 3 separate vehicles from a single depot, wherein the vehicles travel (D-1-2-D), (D-3-5-D), and (D-4-D), respectively, all returning to the same depot 701, which is applied to bag 73(4). In this way, each qubit of a quantum computer receives a group of routes to calculate. The solutions are gathered by the routing engine 322 and the bag having the highest efficiency (e.g., 730(3)) in the example of FIG. 7) is selected 750.

FIGS. 8A and 8B provide a mathematical framework for the calculation of a capacitated VRP with Time-Windows for a single depot, consistent with an illustrative embodiment. The objective function provided in equation 1 of FIG. 8A can be governed by the constraints provided in the context of equations 2 to 9 of FIGS. 8A to 8B.

Example Process

Figure 9:
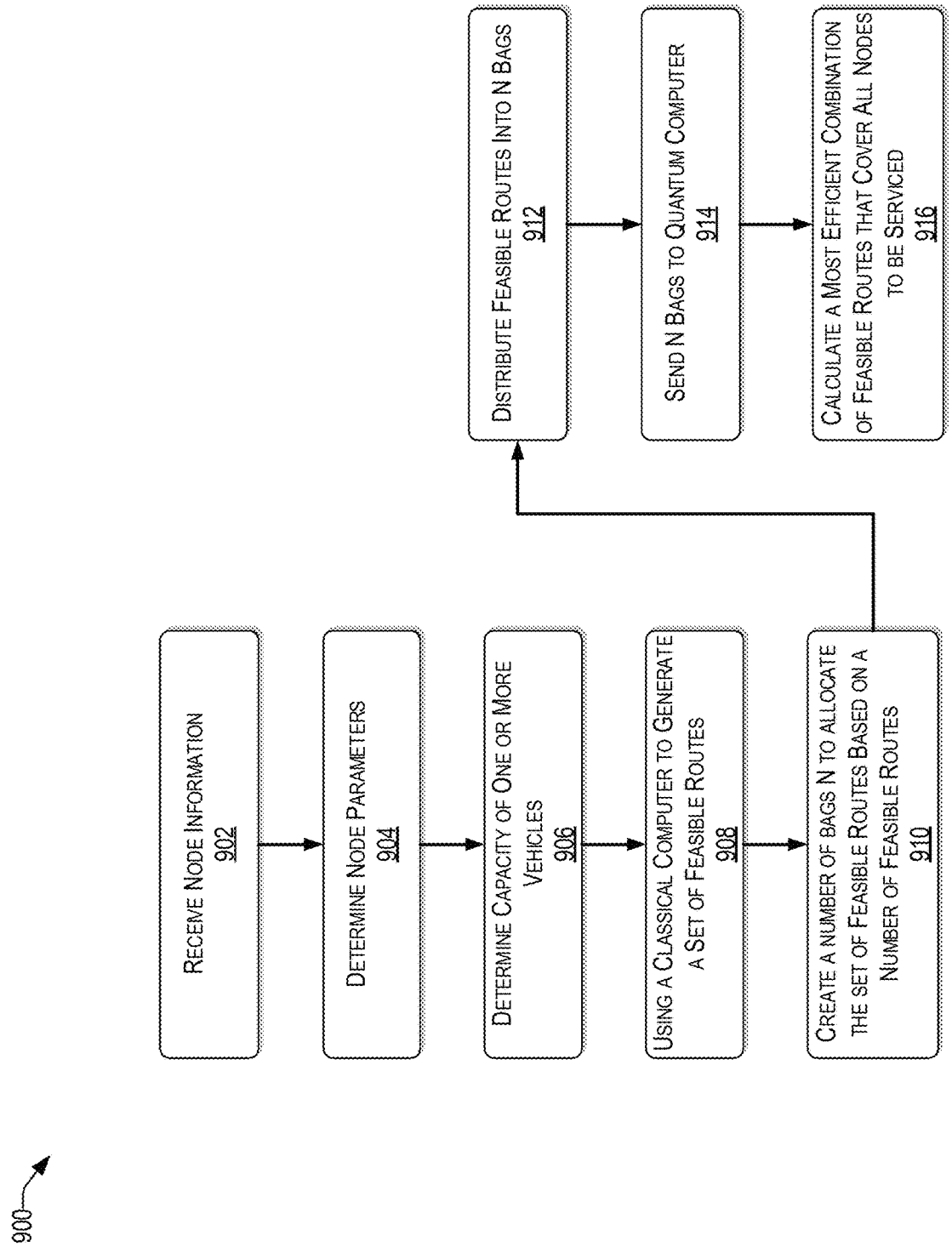
FIG. 9 presents an illustrative process of translating memory addresses while supporting parallel table walks, consistent with an illustrative embodiment.

With the foregoing overview of the example systems and architectures 300 to 700, as well as mathematical formulations of FIGS. 8A and 8B, it may be helpful now to consider a high-level discussion of an example process. To that end, FIG. 9 presents an illustrative process 900 of translating memory addresses while supporting parallel table walks, consistent with an illustrative embodiment. Process 900 is illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 900 is described with reference to the architecture of FIG. 3.

At block 902, the routing engine 322 receives information regarding a set of nodes 302 to be serviced in a service domain 302.

At block 904, the routing engine 322 determines one or more parameters of each node. For example, the parameters may include at least one of a time-window for vehicle arrival, a type of service or a size of package to be delivered, etc.

At block 906, a capacity of each of one or more vehicles is determined.

At block 908, a classical computer 350 is used to generate a set of feasible routes based on the one or more parameters of each node and capacity of each of the one or more vehicles.

At block 910, the routing engine 322 determines a number of bags N to divide the set of feasible routes. In one embodiment, the number of bags is based on a capacity of the quantum computer. For example, the number of bags can be based on a number of qubits of the quantum computer such that a resulting number of routes in each bag is substantially equal to the number of qubits of the quantum computer.

At block 912, the feasible routes are distributed into the N bags. In various embodiments, the distribution of the feasible routes into the N bags can be based on a random selection (e.g., by the classical computing device), or based on each bag including each node to be serviced.

At block 914, the N bags are sent to a quantum computer.

At block 916, the quantum computer 340 calculates a most efficient combination of routes that cover all nodes to be serviced.

Example Computer Platform

Figure 10:
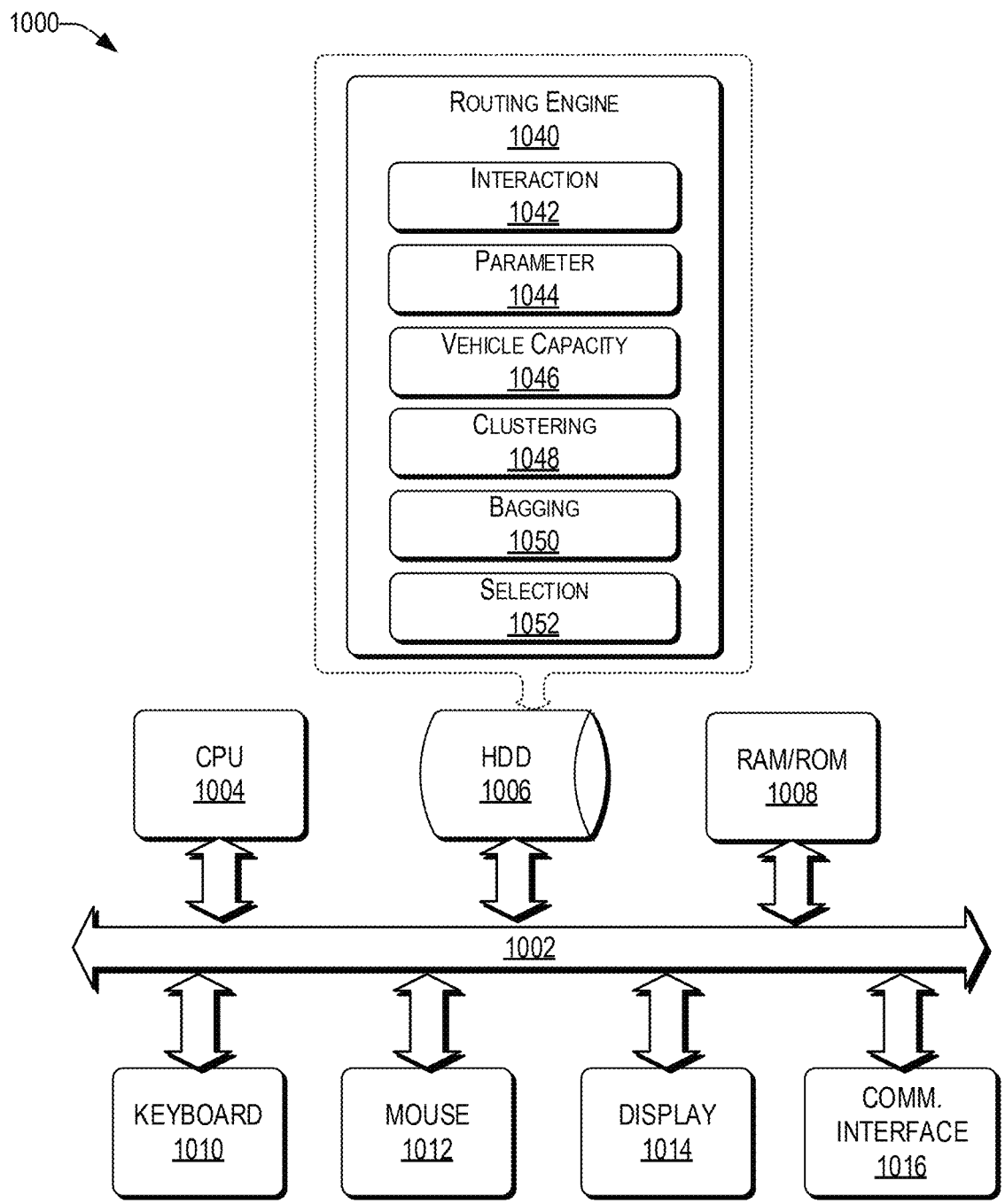
FIG. 10 provides a functional block diagram illustration of a computer hardware platform that can be used to implement a routing server and/or a classical computer of FIG. 3.

In one embodiment, functions relating to a hybrid quantum-classical computing platform involves one or more computing devices. FIG. 10 provides a functional block diagram illustration of a computer hardware platform 1000 that can be used to implement a routing server 320 and/or a classical computer 350 of FIG. 3.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the routing engine 1040, in a manner described herein. The routing engine 1040 may have various modules configured to perform different functions, such those discussed in the context of FIGS. 3 to 7. For example, there may an interaction module 1042 operative to interact with various nodes in a service domain and depots in the service domain, CRM, classical computers, quantum computer, and/or cloud. There may be a parameter module 1044 operative to determine the node parameters from various nodes in a service domain or a CRM associated with the service domains. There may be a capacity module 1046 operative to determine a capacity of each vehicle. There may be a clustering module 1048 operative to cluster nodes in a service domain based on predetermined criteria. There may be a bagging module 1050 operative to calculate a number of bags to use to distribute feasible routes to accommodate the capability of a quantum computer. There may be a selection module 1052 operative to select one or more routes having a highest efficiency while accommodating every node in a cluster.

Example Cloud Platform

As discussed above, functions relating to providing a hybrid quantum-classical computing platform, may include a distributed computing and/or storage architecture as in a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
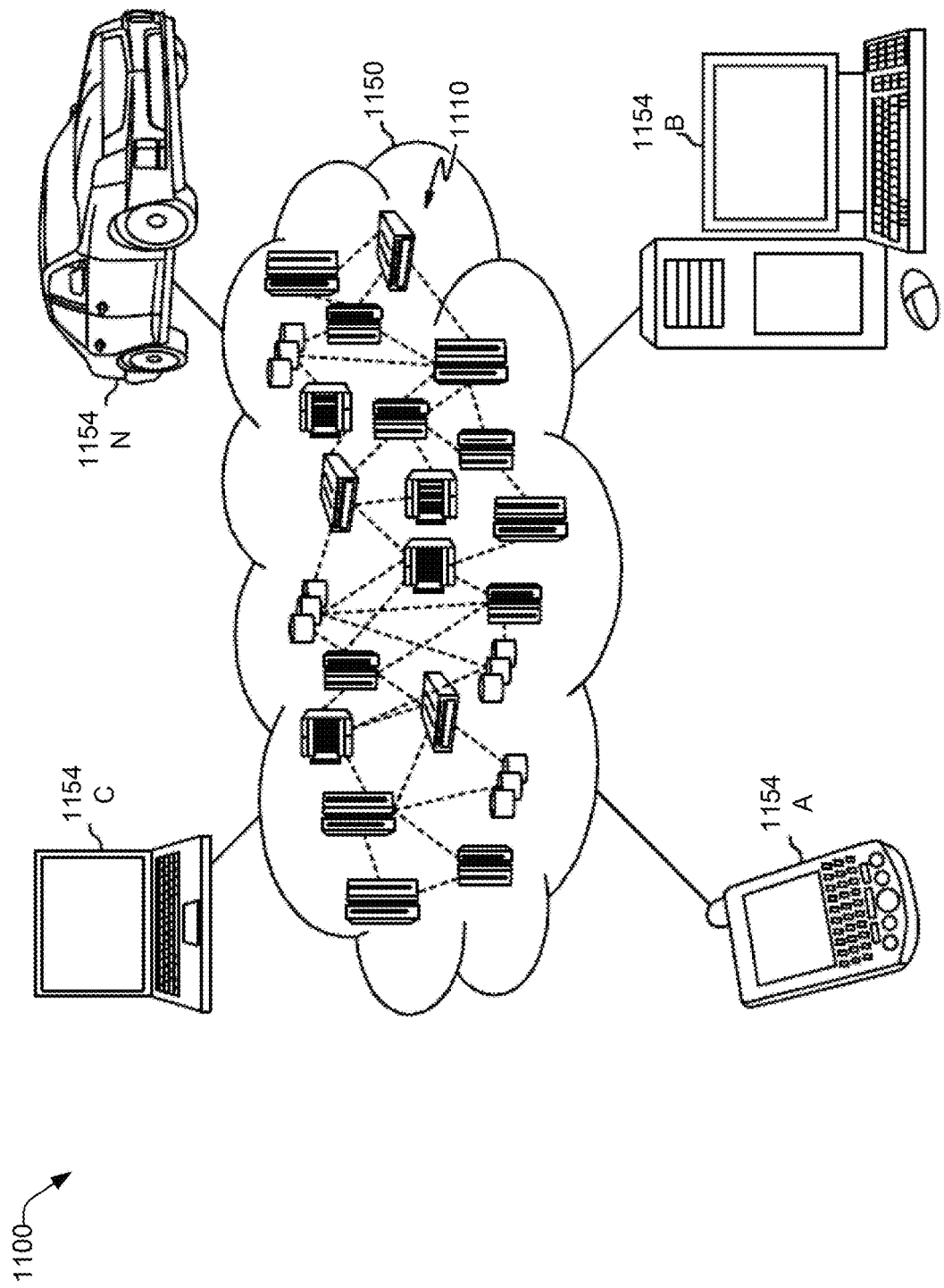
FIG. 11 depicts a cloud computing environment, consistent with an illustrative embodiment.

Referring now to FIG. 11, an illustrative cloud computing environment 1100 is depicted. As shown, cloud computing environment 1100 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
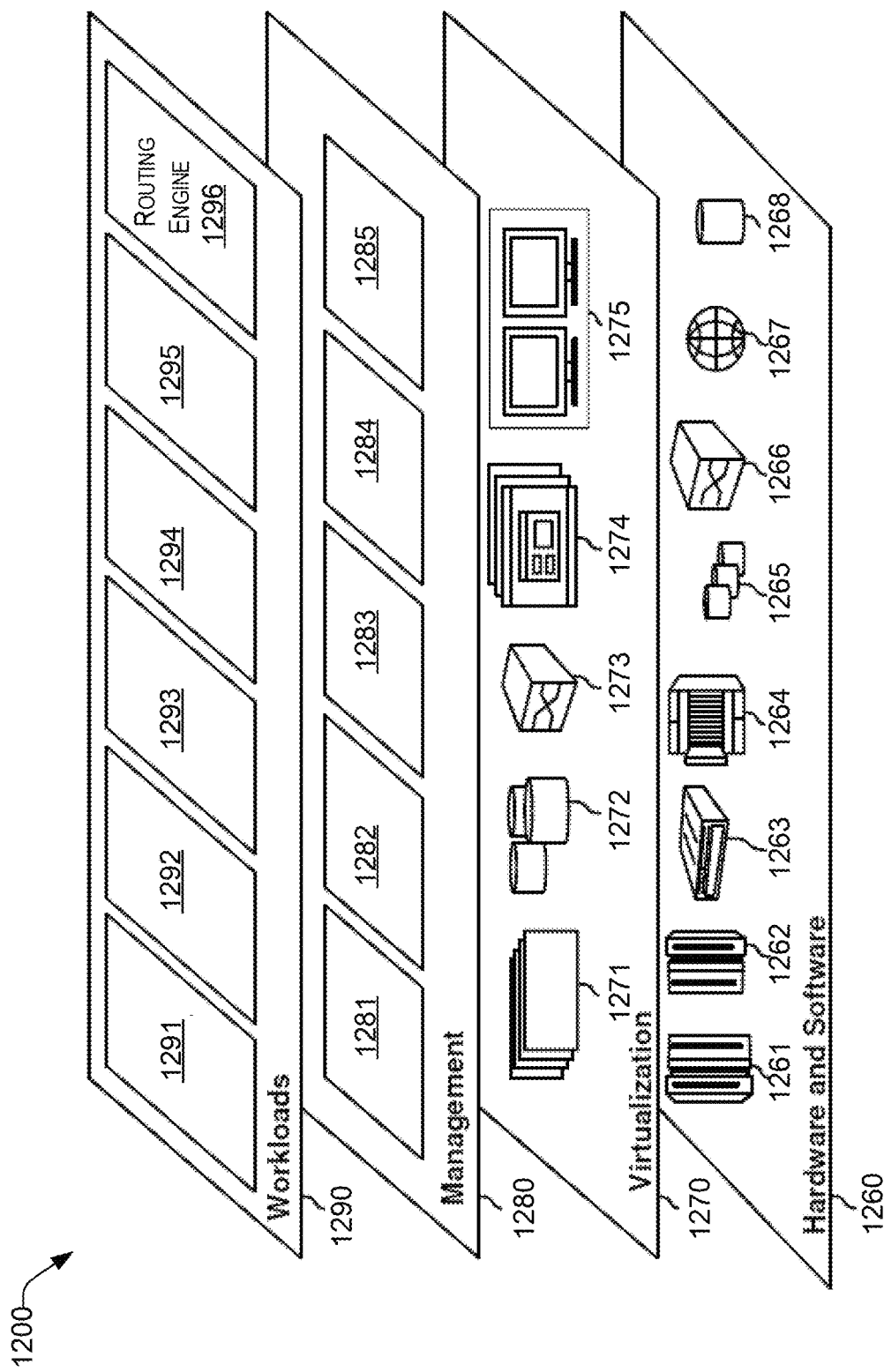
FIG. 12 depicts abstraction model layers, consistent with an illustrative embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and Routing Engine 1296, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a routing engine coupled to the processor and configured to perform acts comprising:
   receiving information regarding a set of nodes to be serviced;
   determining one or more parameters of each node;
   determining a capacity of each of the one or more vehicles;
   using a classical computer to generate a set of feasible routes based on the one or more parameters of each node and the capacity of each of the one or more vehicles;
   creating a number of bags N to allocate the set of feasible routes based on a number of feasible routes;
   distributing the feasible routes into the N bags; and
   sending the N bags to a quantum computer to calculate a most efficient combination of feasible routes that cover all nodes to be serviced.

2. The computing device of claim 1, further comprising, dividing the nodes to be serviced into a predetermined number of clusters.

3. The computing device of claim 2, wherein each cluster is based on a proximity between the nodes to be serviced.

4. The computing device of claim 1, wherein a number of feasible routes in a bag is based on a capacity of the quantum computer.

5. The computing device of claim 1, wherein a number of feasible routes in a bag equals a number of qubits in the quantum computer.

6. The computing device of claim 1, wherein the one or more parameters of each node comprise at least one of:
   a time window for an arrival of a vehicle of the one or more vehicles;
   a duration of service requested by the node; or
   a size of a package to be delivered to the node.

7. The computing device of claim 1, wherein the distribution of the feasible routes into the N bags is based on a random selection from the feasible routes.

8. The computing device of claim 1, wherein the distribution of the feasible routes into the N bags is based on each bag including each node of the set of nodes to be serviced.

9. The computing device of claim 1, wherein calculating a most efficient combination of feasible routes comprises calculating, by the quantum computer, one or more feasible routes that have a lowest overall cost while servicing each node in a predetermined cluster.

10. A non-transitory computer readable storage medium tangibly embodying a computer readable program code having computer readable instructions that, when executed, causes a computing device to carry out a method of generating a route, the method comprising:
    receiving information regarding a set of nodes to be serviced;

determining one or more parameters of each node;

determining a capacity of each of the one or more vehicles;

using a classical computer to generate a set of feasible routes based on the one or more parameters of each node and the capacity of each of the one or more vehicles;

creating a number of bags N to allocate the set of feasible routes based on a number of feasible routes;

distributing the feasible routes into the N bags;

sending the N bags to a quantum computer to calculate a most efficient combination of feasible routes that cover all nodes to be serviced.

11. The non-transitory computer readable storage medium of claim 10, further comprising, dividing the nodes to be serviced into a predetermined number of clusters, wherein each cluster is based on a proximity between the nodes to be serviced.

12. The non-transitory computer readable storage medium of claim 10, wherein a number of feasible routes in a bag is based on a capacity of the quantum computer.

13. The non-transitory computer readable storage medium of claim 10, wherein a number of feasible routes in a bag equals a number of qubits in the quantum computer.

14. The non-transitory computer readable storage medium of claim 10, wherein the one or more parameters of each node comprise at least one of:

a time window for an arrival of a vehicle of the one or more vehicles;

a duration of service requested by the node; or a size of a package to be delivered to the node.

15. The non-transitory computer readable storage medium of claim 10, wherein the distribution of the feasible routes into the N bags is based on a random selection from the feasible routes.

16. The non-transitory computer readable storage medium of claim 10, wherein the distribution of the feasible routes into the N bags is based on each bag including each node of the set of nodes to be serviced.

17. The non-transitory computer readable storage medium of claim 10, wherein calculating a most efficient combination of feasible routes comprises calculating, by the quantum computer, one or more feasible routes that have a lowest overall cost while servicing each node in a predetermined cluster.

18. A hybrid quantum-classical computing platform for route management comprising:

a classical computing device configured to:

receiving information regarding a set of nodes to be serviced;

determining one or more parameters of each node;

determining a capacity of each of the one or more vehicles;

generating a set of feasible routes based on the one or more parameters of each node and the capacity of each of the one or more vehicles;

creating a number of bags N to allocate the set of feasible routes based on a number of feasible routes; and distributing the feasible routes into the N bags;

a quantum computing device configured to:

for each of the N bags, applying a feasible route to a corresponding qubit; and calculating a most efficient combination of feasible routes that cover all nodes to be serviced.

19. The hybrid quantum-classical computing platform of claim 18, wherein the classical computing device is further configured to dividing the nodes to be serviced into a predetermined number of clusters, wherein each cluster is based on a proximity between the nodes to be serviced.

20. The non-transitory computer readable storage medium of claim 18, wherein the distribution of the feasible routes into the N bags is based on:

a random selection from the feasible routes; or each bag including each node of the set of nodes to be serviced.

* * * * *